(12) United States Patent
Ye et al.

(10) Patent No.: US 10,895,334 B2
(45) Date of Patent: Jan. 19, 2021

(54) COMPOSITE PIPE AND METHOD FOR MANUFACTURING THE SAME

(71) Applicants: ZHEJIANG XINZHOU BAMBOO-BASED COMPOSITES TECHNOLOGY CO., LTD., Hangzhou (CN); Ling Ye, Huzhou (CN)

(72) Inventors: Ling Ye, Huzhou (CN); Xin Zhu, Huzhou (CN); Lin Niu, Huzhou (CN)

(73) Assignees: ZHEJIANG XINZHOU BAMBOO-BASED COMPOSITES TECHNOLOGY CO., LTD., Hangzhou (CN); Ling Ye, Huzhou (CN)

( * ) Notice: Subject to any disclaimer, the term of this patent is extended or adjusted under 35 U.S.C. 154(b) by 29 days.

(21) Appl. No.: 15/876,195

(22) Filed: Jan. 21, 2018

(65) Prior Publication Data

US 2018/0142811 A1     May 24, 2018

Related U.S. Application Data

(63) Continuation-in-part of application No. PCT/CN2016/109590, filed on Dec. 13, 2016.

(30) Foreign Application Priority Data

Feb. 2, 2016   (CN) .......................... 2016 1 0074186

(51) Int. Cl.
*F16L 11/00* (2006.01)
*F16L 9/16* (2006.01)
*F16L 9/12* (2006.01)
*B32B 5/02* (2006.01)
*F16L 9/128* (2006.01)

(52) U.S. Cl.
CPC ................. *F16L 9/16* (2013.01); *B32B 5/02* (2013.01); *F16L 9/12* (2013.01); *B32B 2255/02* (2013.01); *B32B 2262/065* (2013.01); *B32B 2307/73* (2013.01); *B32B 2597/00* (2013.01); *F16L 9/128* (2013.01)

(58) Field of Classification Search
CPC ......... F16L 9/16; B32B 5/02; B32B 2262/065
USPC ........................................ 138/125, 126, 153
See application file for complete search history.

(56) References Cited

U.S. PATENT DOCUMENTS

| 1,921,068 A * | 8/1933 | Boyden | .................. A63B 53/10 473/322 |
| 3,022,802 A * | 2/1962 | Lewis | ....................... F16L 9/12 138/125 |
| 3,500,869 A * | 3/1970 | Skoggard | ................ B29C 63/00 138/130 |

(Continued)

*Primary Examiner* — James F Hook
(74) *Attorney, Agent, or Firm* — Matthias Scholl P.C.; Matthias Scholl

(57) ABSTRACT

A composite pipe, including, successively, from the inside out in the radial direction of the composite pipe: an inner liner layer; a reinforced layer; and an outer protective layer. The reinforced layer includes a bamboo fiber reinforced layer and a straw reinforced layer. The bamboo fiber reinforced layer includes a plurality of bamboo strip layers. Each bamboo strip layer includes winding bamboo strips. The straw reinforced layer includes a plurality of straw layers. Each straw layer includes winding stems of straw.

8 Claims, 1 Drawing Sheet

(56) References Cited

U.S. PATENT DOCUMENTS

| | | | | |
|---|---|---|---|---|
| 3,532,132 | A * | 10/1970 | Rubenstein | F16L 1/038 138/172 |
| 5,871,034 | A * | 2/1999 | Sumner | F16L 59/14 138/149 |
| 6,390,141 | B1 * | 5/2002 | Fisher | F16L 11/088 138/137 |
| 10,184,223 | B2 * | 1/2019 | Ye | F16L 9/16 |
| 10,190,705 | B2 * | 1/2019 | Ye | F16L 9/16 |
| 2006/0062959 | A1 * | 3/2006 | Gerardo Elpidio | E04C 2/16 428/105 |
| 2008/0210328 | A1 * | 9/2008 | Henry | F16L 11/086 138/126 |
| 2012/0071590 | A1 * | 3/2012 | Parssinen | A61L 15/12 524/13 |
| 2013/0000767 | A1 * | 1/2013 | Nonaka | B29C 70/026 138/106 |
| 2014/0373962 | A1 * | 12/2014 | Lamontia | F16L 11/086 138/125 |
| 2015/0050441 | A1 * | 2/2015 | Troi | B29C 70/542 428/36.4 |
| 2016/0245429 | A1 * | 8/2016 | Zhu | F16L 9/14 |
| 2017/0326863 | A1 * | 11/2017 | Wang | B32B 7/12 |
| 2018/0038521 | A1 * | 2/2018 | Ye | F16L 9/14 |

* cited by examiner

COMPOSITE PIPE AND METHOD FOR MANUFACTURING THE SAME

CROSS-REFERENCE TO RELATED APPLICATIONS

This application is a continuation-in-part of International Patent Application No. PCT/CN2016/109590 with an international filing date of Dec. 13, 2016, designating the United States, and further claims foreign priority benefits to Chinese Patent Application No. 201610074186.4 filed Feb. 2, 2016. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The disclosure relates to a composite pipe, and, in particular, to a composite pipe and a method for manufacturing the same.

Description of the Related Art

In the fields of agricultural irrigation, water supply and drainage, and building ventilation, cement pipes, polyvinyl chloride pipes, polyethylene pipes, polypropylene pipes, fiber reinforce plastic (FRP) pipes, and thin iron pipes are widely used.

Cement pipes are heavy, porous, and relatively weak.

Polyvinyl chloride pipes, polyethylene pipes, polypropylene pipes are insufficient in rigidity and strength, and the raw materials used to manufacture the same are synthetic petrochemicals, which are environmentally unfriendly.

FRP pipes and FRPM pipes are made of glass fiber, and their preparation is energy-intensive.

Thin iron pipes are prone to corrosion.

SUMMARY OF THE INVENTION

To achieve the above objective, in accordance with one embodiment of the invention, there is provided a composite pipe and a method for manufacturing the same. The composite pipe is made from bamboo fiber and straw. By rational use of straws, the production process of the composite pipe makes full use of idle resources and lowers the production costs. The produced composite pipe is characterized by energy conservation and environmental protection, lightweight, and low costs, so it is suitable for use in the fields of agricultural irrigation, drainage, and petrochemical anti-corrosion.

To achieve the above objective, in accordance with one embodiment of the invention, there is provided a composite pipe comprising, successively, from the inside out in a radial direction of the composite pipe: an inner liner layer; a reinforced layer; and an outer protective layer. The reinforced layer comprises a bamboo fiber reinforced layer and a straw reinforced layer; the bamboo fiber reinforced layer comprises a plurality of bamboo strip layers, each bamboo strip layer comprising winding bamboo strips; and the straw reinforced layer comprises a plurality of straw layers, each straw layer comprising winding stems of straw.

In a class of this embodiment, the composite pipe further comprises an auxiliary reinforced layer disposed between the plurality of bamboo strip layers, between the plurality of straw layers, or between the plurality of bamboo strip layers and the plurality of straw layers; wherein the auxiliary reinforced layer is a paste layer comprising a resin and a filler, and the filler is a natural plant filler or an inorganic mineral filler.

In a class of this embodiment, the natural plant filler is bamboo fiber, wood fiber, hemp fiber, plant shell fiber, or a mixture thereof.

In a class of this embodiment, the inorganic mineral filler is rock powder and/or ore in the shape of granule and/or powder.

In a class of this embodiment, the straw is wheat straw, rice straw, corn straw, broomcorn straw, or a mixture thereof.

In a class of this embodiment, the straw reinforced layer is disposed between two of the plurality of bamboo strip layers of the bamboo fiber reinforced layer.

In a further aspect, the disclosure provides a method for manufacturing the composite pipe, the method comprising the following steps:

cutting raw bamboo into bamboo chips; removing skins and piths of the bamboo chips, and slicing the resulting bamboo chips into bamboo strips; drying the bamboo strips; connecting the dried bamboo strips into a bamboo belt, and rolling the bamboo belt to obtain a bamboo strip roll;

providing straw and collecting stems thereof; drying the stems and cutting the stems in equal length;

coating a fabric and an adhesive on a straight pipe mold to yield an inner liner layer;

unrolling the bamboo strip roll to obtain the bamboo belt, winding the bamboo belt on the inner liner layer, feeding an adhesive to the bamboo belt to coat the bamboo strips of the bamboo belt by the adhesive, and curing the bamboo belt to obtain a bamboo fiber reinforced layer;

winding a grid cloth on the bamboo fiber reinforced layer; parallelly arranging the stems of the straw on the grid cloth; pressing and flattening the arranged stems of the straw, sewing the stems of the straw perpendicularly to an arrangement direction of the stems of the straw; transporting the sewed stems of the straw along with the grid cloth, impregnating the sewed stems of the straw in a resin impregnator; winding and curing the impregnated stems of the straw on the bamboo fiber reinforced layer to obtain a straw reinforced layer; and coating an antiseptic and waterproof material on the straw reinforced layer to form an outer protective layer.

In a class of this embodiment, a moisture content of the dried stems of the straw is 7%-13%.

In a class of this embodiment, an arrangement direction of the stems of the straw is same as a transport direction of the grid cloth.

In still a further aspect, the disclosure provides a method for manufacturing the composite pipe, the method comprising the following steps:

cutting raw bamboo into bamboo chips; removing skins and piths of the bamboo chips, and slicing the resulting bamboo chips into bamboo strips; drying the bamboo strips; connecting the dried bamboo strips into a bamboo belt, and rolling the bamboo belt to obtain a bamboo strip roll;

providing straw and collecting stems thereof; drying the stems and cutting the stems in equal length;

coating a fabric and an adhesive on a straight pipe mold to yield an inner liner layer;

unrolling the bamboo strip roll to obtain the bamboo belt, winding the bamboo belt on the inner liner layer, feeding an adhesive to the bamboo belt to coat the bamboo strips of the bamboo belt by the adhesive, and curing the bamboo belt to obtain a bamboo fiber reinforced layer;

mixing and stirring a resin and a filler to yield a paste; evenly coating the paste onto a lining cloth, enwrapping the bamboo fiber reinforced layer using the lining cloth on to yield an auxiliary reinforced layer;

winding a grid cloth on the bamboo fiber reinforced layer; parallelly arranging the stems of the straw on the grid cloth; pressing and flattening the arranged stems of the straw, sewing the stems of the straw perpendicularly to an arrangement direction of the stems of the straw; transporting the sewed stems of the straw along with the grid cloth, impregnating the sewed stems of the straw in a resin impregnator; winding and curing the impregnated stems of the straw on the bamboo fiber reinforced layer to obtain a straw reinforced layer; and coating an antiseptic and waterproof material on the straw reinforced layer to form an outer protective layer.

Advantages of the above technical solutions conceived by the disclosure are summarized as follows: the composite pipe of the disclosure adopts a composite structure. The reinforced layer is made of environmentally friendly and renewable bamboo and straw. By making full use of the axial tensile strength of bamboo and straw materials, the pipes are manufactured by winding bamboo and straw exhibiting high axial tensile strength and exhibit strong mechanical strength. As a fast-renewable and environment-friendly resource, bamboo possesses the characteristics of light weight, high strength, high rigidity, corrosion resistance and low price; and crop straw possesses the characteristics of wide distribution, short growth period, high processing efficiency and low price. The disclosure makes full use of idle resources by adopting above-mentioned materials to manufacture the composite pipe. During the processing of the straw reinforced layer, the straws are delivered to a mold and oriented. The straws in different diameters are directly flattened into flakes having the same thickness without sorting, improving the processing efficiency and decreasing the production cost. Meanwhile, adopting plant straw not only increases the rigidity of the pipe, but also reduces the weight of the pipe, thus facilitating the transportation.

DETAILED DESCRIPTION OF THE EMBODIMENTS

Figure 1:
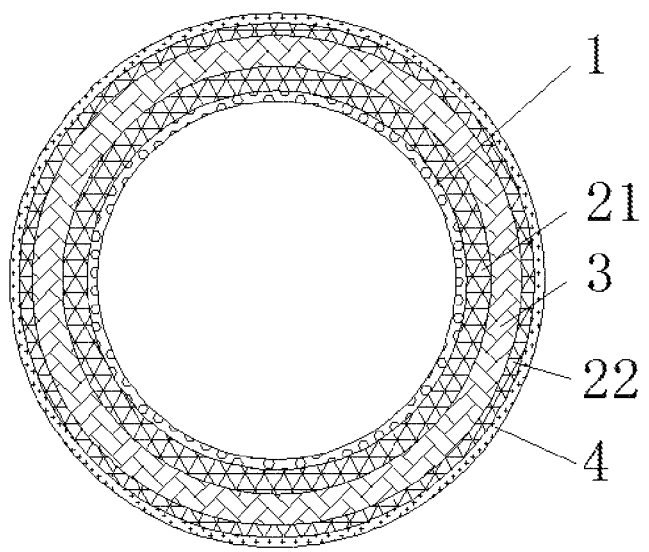
FIG. 1 is a structure diagram of a composite pipe according to an embodiment of the disclosure.

To further illustrate the invention, experiments detailing a composite pipe and method for manufacturing the same are described below. It should be noted that the following examples are intended to describe and not to limit the invention.

A composite pipe, comprises, successively, from the inside out in a radial direction of the composite pipe: an inner liner layer, a reinforced layer and an outer protective layer. The reinforced layer comprises a bamboo fiber reinforced layer and a straw reinforced layer. The bamboo fiber reinforced layer comprises a plurality of bamboo strip layer formed by winding bamboo strips; and the straw reinforced layer comprises a plurality of straw reinforced layer formed by winding the stems of the straw. The straw reinforced layer is disposed between the inner liner and the bamboo fiber reinforced layer, or between the bamboo fiber reinforced layer and the outer protective layer. The specific order is not limited, and is all within the scope of the invention protection.

The straw exhibits certain strength and can be matched with bamboo as the auxiliary reinforcing material. Besides, the straw is cheaper and easily available for its wide source than bamboo, and can be fully used as an idle resource. Therefore, a composite pipe can guarantee product strength, reduce the cost, improve the utilization efficiency of idle resources, and expand the sources of raw materials. In addition, the axial tensile strength of straw and bamboo can be brought into full play by the winding process.

On the basis of the embodiment mentioned above, an auxiliary reinforced layer comprising a resin and a filler is disposed between the plurality of bamboo strip layers, between the plurality of straw layers, or between the plurality of bamboo strip layers and the plurality of straw layers; the filler is a natural plant filler or an inorganic mineral filler. By disposing the auxiliary reinforced layer made of natural plant fillers or inorganic mineral fillers, the strength and stiffness of the pipe body are improved, which is green and environmental friendly. The auxiliary reinforced layer is one or more in number.

On the basis of the embodiment mentioned above, the natural plant filler is bamboo fiber, wood fiber, hemp fiber, plant shell fiber, or a mixture thereof. The fiber filler is characterized in high strength, in the shape of a flaky or a powdery, and is mixed and stirred with an adhesive.

On the basis of the embodiment mentioned above, the inorganic mineral filler is granular or powdery inorganic minerals, such as rock powder, ore.

On the basis of the embodiment mentioned above, the straw is wheat straw, rice straw, corn straw, broomcorn straw, or a mixture thereof.

On the basis of the embodiment mentioned above, the straw reinforced layer is disposed between two of the plurality of bamboo strip layers of the bamboo fiber reinforced layer. Because straw exhibits relatively low strength compared with bamboo, the internal pressure and external pressure are mainly loaded on the innermost layer and the outermost layer of the pipe, the straw reinforced layer is preferably arranged between two bamboo strip layers to provide strength, thus increasing the service life of the product. The straw reinforced layer can be one or more layers.

A method for manufacturing composite pipe mentioned above according to an embodiment of the disclosure, comprises the following steps:

pretreatment of bamboo fiber and straw: cutting raw bamboo into bamboo chips; removing the skin and pith of the bamboo chips, and slicing the same into bamboo strips; drying the bamboo strips and arranging the same in parallel; connecting the bamboo strips into a bamboo belt, and rolling the bamboo belt to obtain a bamboo strip roll; providing straw and collecting stems thereof; drying and then cutting the stems of the straw to same length;

manufacture of the inner liner layer: manufacturing an antiseptic and impermeable inner liner layer by using a fabric and an adhesive on straight pipe mold;

manufacture of the bamboo fiber reinforced layer: unrolling the bamboo strip roll to obtain the bamboo belt, winding the same on the mold, and simultaneously feeding the adhesive to the bamboo belt to ensure that the bamboo strip of the bamboo belt is completely coated by the adhesive, then curing the bamboo belt to obtain a bamboo fiber reinforced layer;

manufacture of the straw reinforced layer: winding a grid cloth on the mold, installing a hopper over the grid cloth to deliver the stems of the straw in the same direction, and ensuring that the stems of the straw being parallelly and tightly arranged on the grid cloth while delivering the stems of the straw to the mold along the grid cloth; then pressing the arranged stems of the straw into flake using press-mounting machine, subsequently sewing thread using sewing machine, perpendicular to arrangement direction of the stems of the straw; transporting the stems of the straw with the grid cloth, then impregnating the stems of the straw in resin impregnator; winding the stems of the straw impregnated on the mold, and acquiring straw reinforced layer by curing;

manufacture of the outer protective layer: finally, coating an antiseptic and waterproof material on the surface of straw reinforced layer to form an outer protective layer.

On the basis of the embodiment mentioned above, the moisture content of the straw is 7%-13%.

On the basis of the embodiment mentioned above, the arrangement direction of the stems of the straw is same as the transport direction of the grid cloth.

The following are specific examples of the disclosure.

Example 1

In the present example, a straw bamboo wound composite pipe having a nominal diameter of 200 mm and a pressure grade of 1.0 mPa was manufacture. The method for manufacturing the composite pipe is specifically described. Detailed steps are as follows:

1) Pretreatment of bamboo fiber and straw:

cutting a fresh bamboo into bamboo chips; removing the skin and pith of the bamboo chips, and slicing the same into bamboo strips having a length of 1 m, a thickness of 5 mm, and a width of 1 mm; drying the bamboo strips and arranging 10 bamboo strips in parallel as a row; lining the back of the whole row of bamboo strips with grid cloth, and sewing by using a sewing machine to forma bamboo belt; docking the head of a row of bamboo belt and the tail of another row of bamboo belt, and sewing the docking part by using the sewing machine to form a continuous bamboo belt reaching a length of several meters, dozens of meters or more, rolling the bamboo belt to obtain a bamboo strip roll.

selecting one or more of wheat, rice, corn and broomcorn straw; removing other part of the straw except the stems of the straw; drying the stems of the straw to 10% moisture content, and then cutting the dried stems of the straw into a same length.

2) Manufacture of the inner liner layer:

coating a polyester film having a thickness of 0.04 mm, as a release layer, on a polished straight pipe mold having an outer diameter of 200 mm; adopting an adhesive, bamboo fiber non-woven fabric and glass fiber knitted felt to manufacture the inner liner layer 1 having a thickness of 1.5 mm on the release layer of the straight pipe mold. The inner liner layer is anti-seepage and includes a smooth inner wall. The inner liner layer 1 comprises, along the radial direction from the inside out, wood fiber non-woven fabric and glass fiber knitted mat; the wood fiber non-woven fabric is adopted as a natural fiber fabric layer, and the glass fiber knitted mat is adopted as a reinforced fabric layer; the wood fiber non-woven fabric and the glass fiber knitted mat are immersed in the adhesive; the adhesive comprises a resin and a curing agent, and the resin adopts an epoxy resin which is characterized in excellent anticorrosion performance.

3) Manufacture of an inner reinforced layer of the bamboo fiber:

after curing the lining layer, unrolling the bamboo belt, smoothly winding the same on the inner liner layer 1 of the straight pipe mold; during the winding process, the bamboo belt is immersed in the adhesive, and winding one or more layers of the bamboo belt to meet the design thickness of 4 mm; after winding, heating the pipe to 80° C. and curing for 120 minutes to obtain an inner reinforced layer 21 of the bamboo fiber; among them, the adhesive includes the resin and the curing agent, and the resin specifically refers to an amino resin.

4) Manufacture of the straw reinforced layer:

after curing the inner reinforced layer of the bamboo fiber, installing a hopper over the grid cloth to deliver the stems of the straw in the same direction, and ensuring that the stems of the straw being parallel and tightly arranged on the grid cloth while delivering the stems of the straw to the mold along the grid cloth; then pressing the arranged stems of the straw into flake using press-mounting machine, subsequently sewing thread using sewing machine, perpendicular to arrangement direction of the stems of the straw; transporting the stems of the straw with the grid cloth, then impregnating the stems of the straw in resin impregnator; winding one or more layers of the stems of the straw to reach the design thickness of 6 mm: after winding, heating the pipe to 60° C. and curing for 180 minutes to obtain the straw reinforced layer 3; among them, the adhesive is the same as the adhesive used in bamboo strip layer.

5) Manufacture of an outer reinforced layer of the bamboo fiber: continue to winding the bamboo belt on the straw reinforced layer 3 using the same winding mode as the inner reinforced layer 21 to form an outer reinforced layer 22 of the bamboo fiber having a thickness of 6 mm.

6) Manufacture of the outer protective layer:

coating a layer of waterproof and anticorrosion vinyl ester resin on the straw reinforced layer to obtain the outer protective layer 4 having a thickness of about 1.5 mm.

The structure of the straw and bamboo composite pipe produced in this example is shown in FIG. 1. The composite pipe is performed with hydraulic pressure, from which it is indicated that a short-time hydraulic failure pressure reaches 1.0 mPa, a rigidity reaches 7500 N/m², a circumferential tensile strength reaches 300 kN/m, which fulfills the technical indexes of pressure pipes.

Example 2

In the example, a composite pipe having a nominal diameter of 400 mm and a pressure grade of 0.8 mPa was manufactured. The method for manufacturing the composite pipe is specifically described. Detailed steps are as follows:

1) Pretreatment of bamboo fiber and straw: the same that in Example 1;

2) Manufacture of the inner liner layer: the same as that in Example 1, except that the outer diameter of the straight pipe mold is 400 mm.

3) Manufacture of the bamboo fiber reinforced layer 2: the same as that in Example 1, except that the thickness is 8 mm.

after curing the lining layer, unrolling the bamboo belt, and smoothly winding the same on the inner liner layer 1;

during the winding process, the bamboo belt is fed with the adhesive; winding more than one layers of bamboo belt to reach a design thickness; after winding, curing and obtaining the bamboo fiber reinforced layer 2.

4) Manufacture of the auxiliary reinforced layer 5:

Mixing and stirring the resin and inorganic mineral filler or natural plant filler to yield a paste; the inorganic mineral filler adopts rock powder, ore, etc., and the natural plant filler adopts one or more of wood chip, wood powder, bamboo chip, bamboo powder and plant shuck powder; the mass percentage of the filler is 70%-90%, and the mass percentage of the resin is 10%-30%; uniformly coating the paste on a layer of lining cloth, enwrapping the bamboo fiber reinforced layer 2 using the lining cloth, and tightening and compacting the lining cloth, to form the auxiliary reinforced layer 5 having a thickness of 6 mm; the resin adopts the amino resin.

5) Manufacture of the straw reinforced layer 3: the same as that in Example 1, except that the thickness is 4 mm.

6) Manufacture of the outer protective layer 4: the same as that in Example 1.

coating a layer of waterproof and anticorrosion vinyl ester resin on the straw reinforced layer to obtain an outer protective layer 4 having a thickness of about 1.5 mm.

Figure 2:
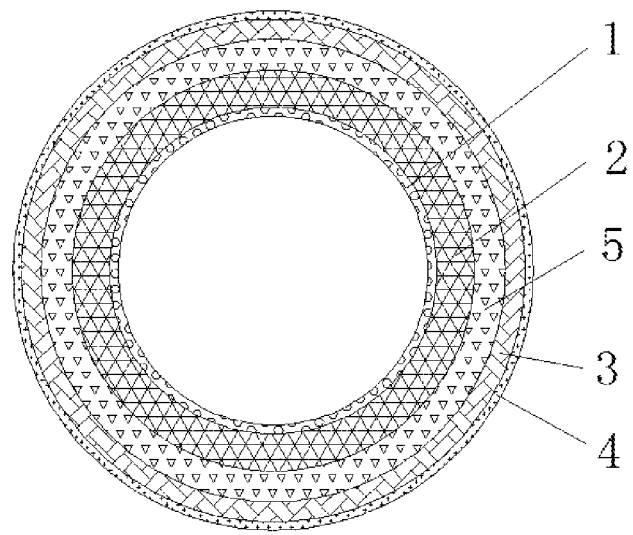
FIG. 2 is a structure diagram of a composite pipe according to another embodiment of the disclosure.

The structure of the straw and bamboo composite pipe produced in this example is shown in FIG. 2. The composite pipe is tested by water pressure, performing a short-time hydraulic failure pressure of 0.8 mPa, a rigidity of 7500 N/m$^2$, a circumferential tensile strength of 420 kN/m, which fulfills the technical indexes of pressure pipes.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A composite pipe, comprising:
    an inner liner layer;
    a reinforced layer; and
    an outer protective layer;
    wherein:
    the inner liner layer, the reinforced layer, and the outer protective layer are of a tubular shape, and are sequentially arranged from inside to outside in a radial direction of the composite pipe;
    the reinforced layer comprises a bamboo fiber reinforced layer and a straw reinforced layer that are of a tubular shape;
    the bamboo fiber reinforced layer comprises a plurality of bamboo strip layers, and each bamboo strip layer comprising a plurality of bamboo strips; wherein in each bamboo strip layer, longitudinal axes of the plurality of bamboo strips are parallel to each other; and the plurality of bamboo strips of each bamboo strip layer is not interwoven with the plurality of bamboo strips of another bamboo strip layer; and
    the straw reinforced layer comprises a plurality of straw layers, and each straw layer comprising a plurality of straw stems; wherein in each straw layer, each of the plurality of straw stems is in a strip shape, and longitudinal axes of the plurality of straw stems are parallel to each other; and the plurality of straw stems of each straw layer is not interwoven with the plurality of straw stems of another straw layer.

2. The pipe of claim 1, further comprising an auxiliary reinforced layer disposed between the plurality of bamboo strip layers, between the plurality of straw layers, or between the plurality of bamboo strip layers and the plurality of straw layers; wherein the auxiliary reinforced layer is a paste layer comprising a resin and a filler, and the filler is a natural plant filler or an inorganic mineral filler.

3. The pipe of claim 2, wherein the natural plant filler is bamboo fiber, wood fiber, hemp fiber, plant shell fiber, or a mixture thereof.

4. The pipe of claim 3, wherein the straw is wheat straw, rice straw, corn straw, broomcorn straw, or a mixture thereof.

5. The pipe of claim 2, wherein the inorganic mineral filler is rock powder and/or ore in the shape of granule and/or powder.

6. The pipe of claim 5, wherein the straw reinforced layer is disposed between two of the plurality of bamboo strip layers of the bamboo fiber reinforced layer.

7. The pipe of claim 1, wherein:
    the composite pipe comprises a first bamboo fiber reinforced layer and a second bamboo fiber reinforced layer; and
    the straw reinforced layer is disposed between the first and the second bamboo fiber reinforced layers.

8. The pipe of claim 1, wherein:
    the bamboo fiber reinforced layer has a thickness of larger than 4 mm; and
    the straw reinforced layer has a thickness of larger than 6 mm.

\* \* \* \* \*